United States Patent
Singh

(10) Patent No.: US 10,412,779 B2
(45) Date of Patent: Sep. 10, 2019

(54) TECHNIQUES TO DYNAMICALLY CONFIGURE JITTER BUFFER SIZING

(71) Applicant: WhatsApp Inc., Mountain View, CA (US)

(72) Inventor: Manpreet Singh, San Carlos, CA (US)

(73) Assignee: WHATSAPP INC., Menlo Park, CA (US)

( * ) Notice: Subject to any disclaimer, the term of this patent is extended or adjusted under 35 U.S.C. 154(b) by 470 days.

(21) Appl. No.: 14/858,492

(22) Filed: Sep. 18, 2015

(65) Prior Publication Data

US 2017/0086250 A1 Mar. 23, 2017

(51) Int. Cl.
| | |
|---|---|
| H04W 76/25 | (2018.01) |
| H04L 29/06 | (2006.01) |
| H04L 12/823 | (2013.01) |
| H04L 12/841 | (2013.01) |
| H04L 12/835 | (2013.01) |

(52) U.S. Cl.
CPC ............ *H04W 76/25* (2018.02); *H04L 65/80* (2013.01); *H04L 47/283* (2013.01); *H04L 47/30* (2013.01); *H04L 47/32* (2013.01); *H04L 65/4092* (2013.01)

(58) Field of Classification Search
CPC ............ H04W 76/045; H04W 28/0278; H04L 47/283; H04L 47/32; H04L 65/602
See application file for complete search history.

(56) References Cited

U.S. PATENT DOCUMENTS

| | | | |
|---|---|---|---|
| 6,452,950 B1* | 9/2002 | Ohlsson | H04J 3/0632 370/516 |
| 7,916,742 B1* | 3/2011 | Bugenhagen | H04J 3/0632 370/352 |
| 9,106,787 B1 | 8/2015 | Holmer et al. | |
| 9,749,178 B2 | 8/2017 | Singh | |
| 2003/0103243 A1 | 6/2003 | Watanabe et al. | |
| 2003/0231589 A1 | 12/2003 | Itoh et al. | |
| 2004/0047369 A1* | 3/2004 | Goel | G10L 19/167 370/516 |
| 2004/0120309 A1* | 6/2004 | Kurittu | G10L 21/04 370/352 |
| 2006/0133358 A1* | 6/2006 | Li | H04B 3/23 370/352 |

(Continued)

OTHER PUBLICATIONS

Office Action received for U.S. Appl. No. 15/659,852, dated Oct. 11, 2017, 18 pages.

*Primary Examiner* — Philip J Chea
*Assistant Examiner* — Robert B McAdams

(57) ABSTRACT

Techniques to dynamically configure jitter buffer sizing are described. In one embodiment, an apparatus may comprise a streaming component operative to perform a streaming network connection for a media stream; a media playback component operative to playback the media stream; and a media buffer component operative to maintain a jitter buffer for a streaming network connection on a client device; generate a media frame distribution based on at least one of media frame retrieval from the jitter buffer by the media playback component and media frame addition to the jitter buffer by the streaming component; determine a jitter buffer target size based on the media frame distribution; and apply the jitter buffer target size to the maintaining of the jitter buffer for the streaming network connection. Other embodiments are described and claimed.

14 Claims, 11 Drawing Sheets

(56) References Cited

U.S. PATENT DOCUMENTS

| | | | |
|---|---|---|---|
| 2006/0218264 A1 | 9/2006 | Ogawa et al. | |
| 2011/0103377 A1* | 5/2011 | Hua | H04L 65/1053 |
| | | | 370/352 |
| 2011/0170417 A1 | 7/2011 | Muramoto et al. | |
| 2013/0100969 A1* | 4/2013 | Vafin | H04J 3/06 |
| | | | 370/517 |
| 2013/0297815 A1 | 11/2013 | Ma | |
| 2015/0350099 A1* | 12/2015 | Sun | H04L 65/80 |
| | | | 370/412 |

* cited by examiner

*600*

Maintain a jitter buffer for a streaming network connection on a client device.
*602*

Generate a media frame distribution based on at least one of media frame retrieval from the jitter buffer by a media playback component and media frame addition to the jitter buffer by a streaming component.
*604*

Determine a jitter buffer target size based on the media frame distribution.
*606*

Apply the jitter buffer target size to the maintaining of the jitter buffer for the streaming network connection.
*608*

*FIG. 6*

TECHNIQUES TO DYNAMICALLY CONFIGURE JITTER BUFFER SIZING

RELATED APPLICATIONS

This application is related to the United States patent application titled "Techniques to Dynamically Configure Target Bitrate for Streaming Network Connections," with Ser. No. 14/859,141, filed on Sep. 18, 2015, which is hereby incorporated by reference in its entirety.

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming audio content such as a voice-over-Internet-Protocol (VoIP) communication exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to dynamically configure jitter buffer sizing. Some embodiments are particularly directed to techniques to dynamically configure jitter buffer sizing based on frame addition and frame retrieval. In one embodiment, for example, an apparatus may comprise a streaming component operative to perform a streaming network connection for a media stream; a media playback component operative to playback the media stream; and a media buffer component operative to maintain a jitter buffer for a streaming network connection on a client device; generate a media frame distribution based on at least one of media frame retrieval from the jitter buffer by the media playback component and media frame addition to the jitter buffer by the streaming component; determine a jitter buffer target size based on the media frame distribution; and apply the jitter buffer target size to the maintaining of the jitter buffer for the streaming network connection. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
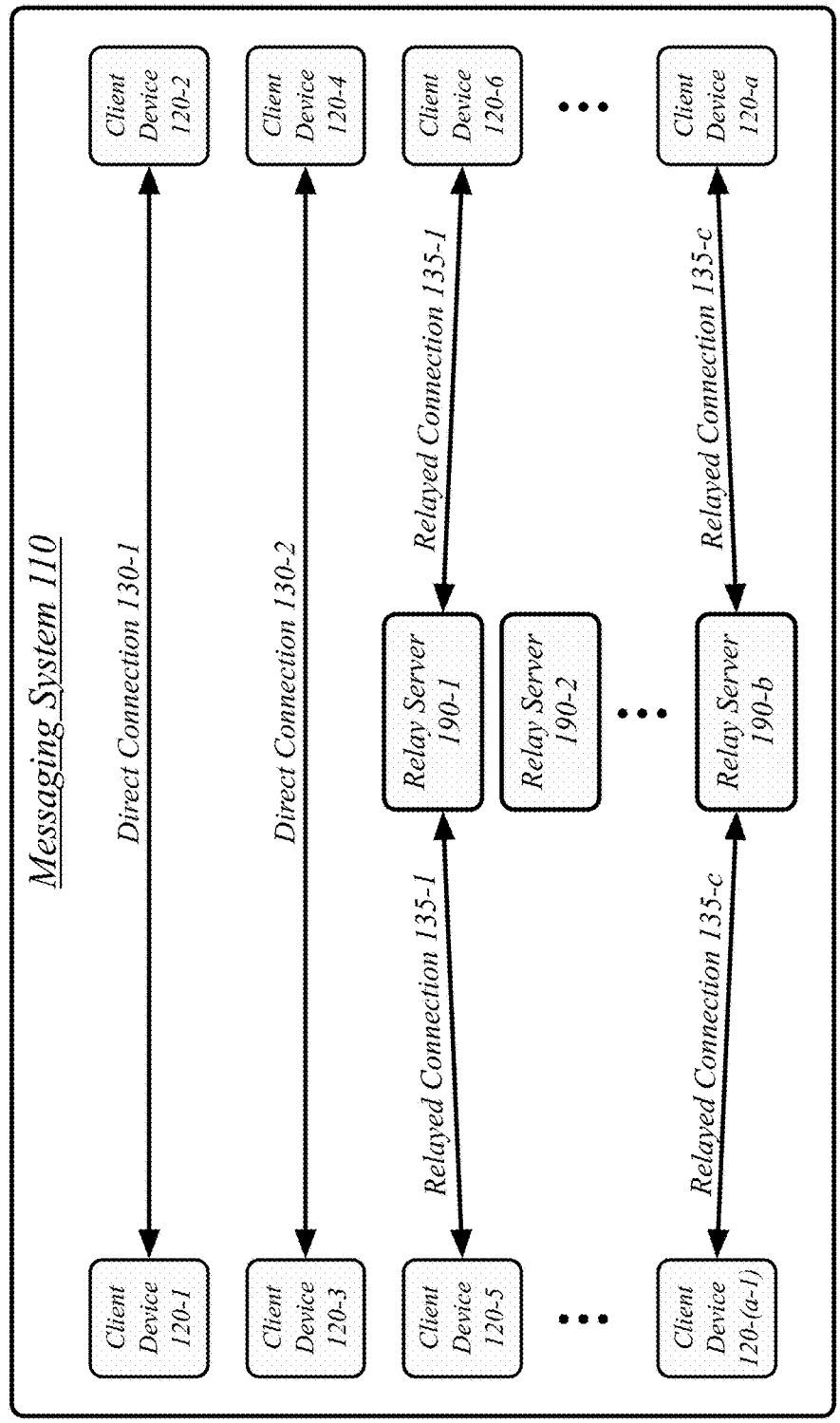
FIG. 1 illustrates an embodiment of a jitter buffer configuration system.

The transmission of packets across a network, particularly a network as complicated as the Internet, invokes the technical problem of handling latency, the delay between the transmission of the packets and the receipt of the packets. This delay may be somewhat consistent, but the distribution of it may include variance, a varying between packets in the delay between their transmission and retrieval. A stream of network packets may experience, for example, a 40 millisecond average latency, but the individual packets may have different individual latencies: 25 milliseconds for a first, 45 milliseconds for a second, etc. This variance in latency may be referred to as network jitter, and a buffering policy for a stream of network packets may benefit from accommodating jitter.

A stream of network packets may carry media frames for media content, such as audio frames for an audio stream such as a voice-over-internet-protocol (VoIP) stream. In some embodiments, a packet may comprise multiple media frames. Two or more media frames delivered in the same network packet may be effectively delivered at the same time, which may combine with the network jitter to produce frame jitter in excess of even the network jitter. A buffering policy for a stream of media frames may therefore also benefit from accommodating jitter.

Further jitter may also be introduced based on the processing performance of the sending or receiving device. Devices, particularly devices with limited processing resources, may not be able to transmit or retrieve frames on a precise regular schedule: the processing of existing frames may occupy processing resources, background applications may occupy processing resources, system processes may occupy processing resources, etc. Jitter may, therefore, comprise jitter introduced by the network, jitter introduced by the packaging of media frames into network packets, jitter introduced by the limitations on processing resources, or from other causes.

Without buffering, jitter may cause an unpleasant playback experience for media content. In general, a media frame will be intended to be played back over a set span of time: a frame may be defined as a twenty-millisecond frame covering twenty-millisecond of, for example, a voice call. Compressing frames together when frames arrive in sequence faster than twenty-millisecond apart, or, conversely, stretching frames or adding frames when frames arrive more than twenty-millisecond apart, may result in strange, illegible, or otherwise undesirable media playback.

However, the more frames are buffered the greater the delay that will be experienced by the user perceiving the media content (e.g., listening, viewing). With pre-recorded media content (e.g., the streaming playback of recorded music, a recorded television show), this delay may merely introduce a brief period before playback commences. While this may be undesirable, much worse is delay in live media content, such as an audio or video call. Delay in the playback of audio call or video call content may create a feeling of lag when engaging in a conversation, causing participants to talk over each other, misinterpret how another participant is engaging with them, and generally experience a lack of immediate connection with the other.

As such, it is desirable to appropriately size a buffer for streaming media frames to accommodate jitter with as small a buffering of the media frames as possible while avoiding significant distortion in the playback. As such, techniques for detecting, analyzing, and accommodating jitter may benefit users of live streaming media. The embodiments herein can therefore improve the performance and user experience of live streaming media, particularly users operating on unreliable, unstable, or otherwise limited network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a jitter buffer configuration system 100. In one embodiment, the jitter buffer configuration system 100 may comprise a computer-implemented system having software applications comprising one or more components. Although the jitter buffer configuration system 100 shown in FIG. 1 has a limited number of elements in a certain topology, it may be appreciated that the jitter buffer configuration system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the jitter buffer configuration system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Jitter buffer configuration system 100 may include an authorization server (or other suitable component(s)) that allows users to opt in to or opt out of having their actions logged by the jitter buffer configuration system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of jitter buffer configuration system 100 and other elements of a messaging system through blocking, data hashing, anonymization, or other suitable techniques as appropriate. For instance, a user may be empowered to configure privacy settings determining whether network usage, such as streaming communication, is logged by the jitter buffer configuration system 100 and analyzed. In some embodiments, a user may be presented with information regarding may be collected and how that information may be used, such as informing the user that collected information may be anonymized prior to analysis.

Figure 2:
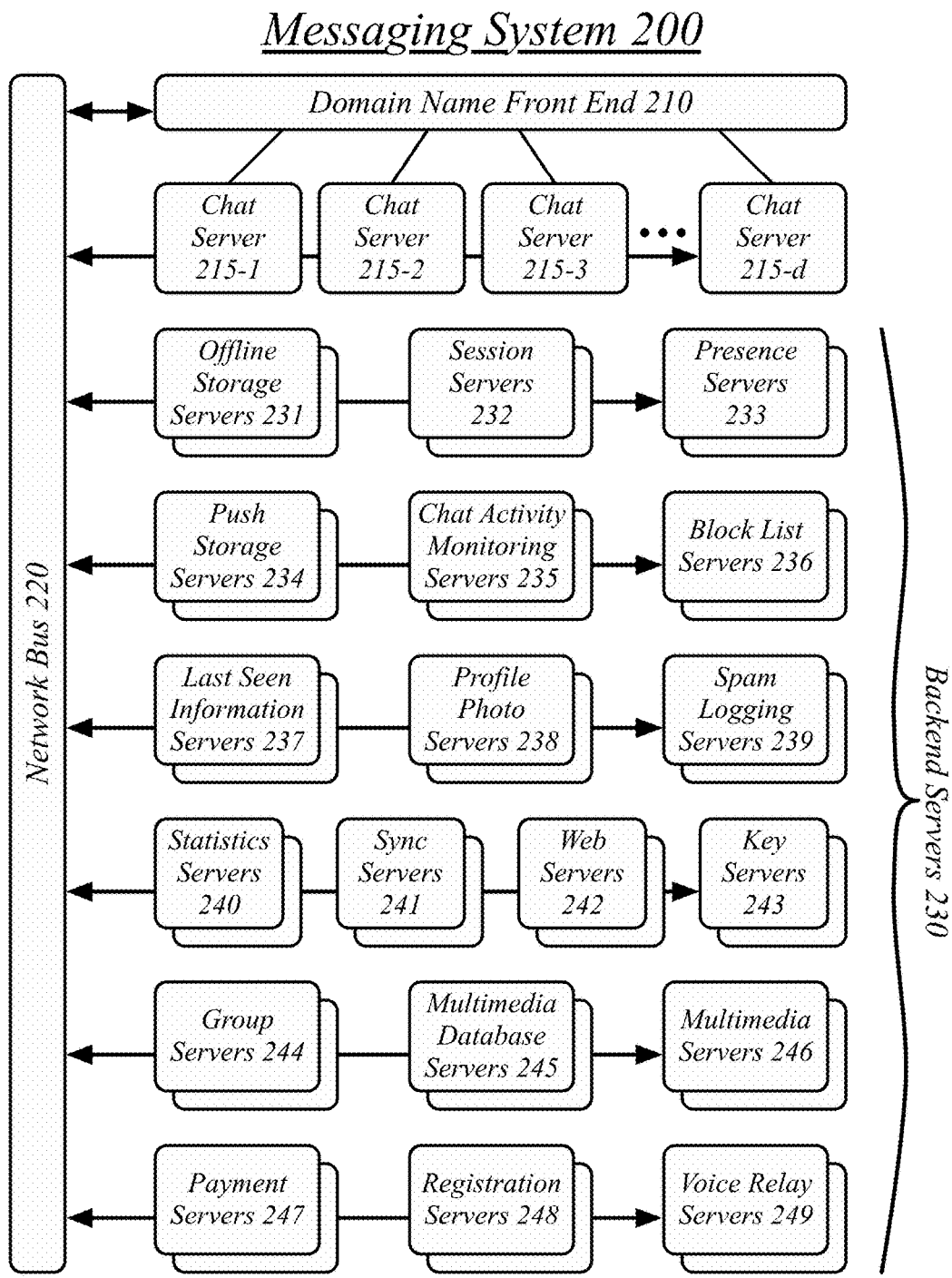
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the jitter buffer configuration system 100 with the operations of the jitter buffer configuration system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
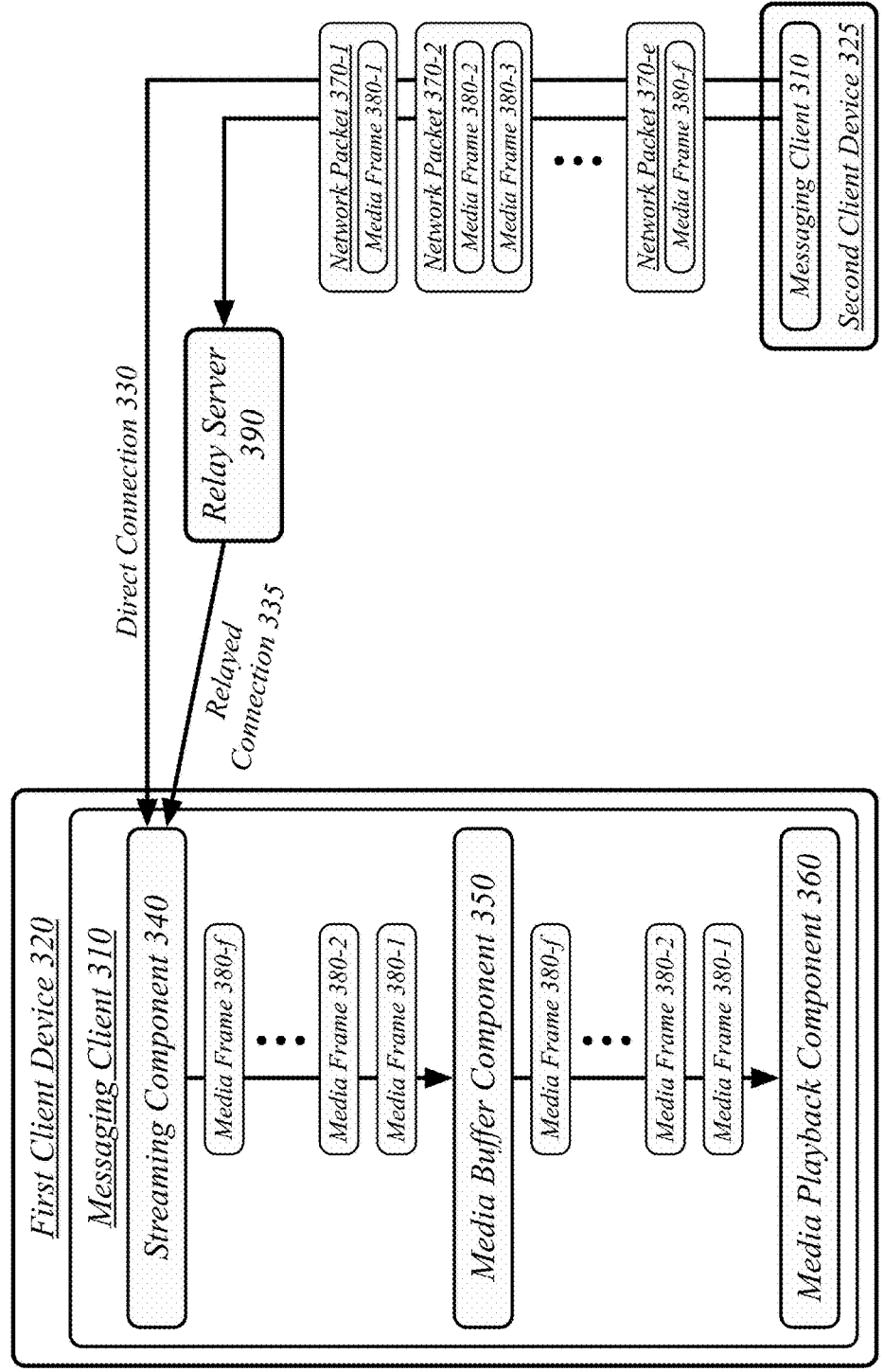
FIG. 3 illustrates an embodiment of a media buffer in operation.

FIG. 3 illustrates an embodiment of a media buffer in operation.

A first client device 320 may engage in a streaming network connection with a second client device 325. Each of the first client device 320 and second client device 325 may execute an instantiation of a messaging client 310. In some cases, the client devices 320, 325 may execute instantiations of different messaging clients that conform to a sufficiently common specification to empower interoperability.

In some cases, the streaming network connection may be a direct connection 330 in which the outgoing network packets from the first client device 320 are addressed to the public-facing address associated with the second client device 325 and the outgoing network packets from the second client device 325 are addressed to the public-facing address associated with the first client device 320. In other cases, the streaming network connection may be a relayed connection 335 in which the outgoing network packets from the first client device 320 and second client device 325 are addressed to a relay server 390, with the relay server 390 operative to forward network packets received from one client device to the other client device. A relay server 390 may comprise one relay server of a plurality of relay servers 190 provided as part of a messaging system 110.

A messaging client 310 may comprise a streaming component 340, the streaming component generally arranged to establish and carry out the performance of a streaming network connection carrying streaming media content as a media stream. The streaming network connection may comprise a sequence of network packets 370. A network packet may comprise a user datagram protocol (UDP) or transmission control protocol (TCP) addressed using the internet protocol (IP), thereby forming UDP/IP or TCP/IP packets. In some embodiments, UDP/IP may be preferentially used as it may be preferable to miss a packet than introduce the additional delay of requesting and receiving a replacement to a missed packet.

The streaming component 340 may be operative to receive a plurality of network packets 370, wherein each of the plurality of network packets 370 comprises one or more media frames 380. The streaming component 340 may be operative to extract the media frames 380 from the network packets 370 and pass the media frames 380 to a media buffer component 350. A media frame may comprise an encoded portion of a media stream covering a predefined length of time, wherein playback of the media frames 380 in sequences produces a media playback of a live-recorded media event, such as a voice or video call.

The messaging client 310 may comprise a media buffer component 350, the media buffer component 350 generally arranged to maintain a media frame buffer buffering media frames 380 prior to playback by the media playback component 360. The media buffer component 350 may be operative to receive media frames 380 from the streaming component 340 and to store the media frames 380 until retrieval in a data structure in memory on the first client device 320. The media buffer component 350 may be operative to receive requests for media frames from the media playback component 360 and to provide media frames 380 upon request to the media playback component 360.

The media frame buffer may comprise a jitter buffer operative to use buffering to compensate for jitter in the reception of media frames across the streaming network connection as well as other sources of jitter. The media buffer component 360 may determine a jitter buffer target size based on a media frame distribution and enact media buffer policies to guide the jitter buffer towards an occupancy equal to the jitter buffer target size. Where a current occupancy of the jitter buffer is greater than the jitter buffer target size the media buffer component 350 may guide the jitter buffer towards an occupancy equal to the jitter buffer target size by dropping one or more media frames, combining one or more media frames, or otherwise reducing the occupancy of the jitter buffer at a rate faster than the rate of requests from the media playback component 360. Where a current occupancy of the jitter buffer is less than the jitter buffer target size the media buffer component 350 may guide the jitter buffer towards an occupancy equal to the jitter buffer target size by allowing the jitter buffer to fill up to the target size, refraining from using buffer-reduction techniques until the jitter buffer fills up beyond the target size. A jitter buffer may be set to an initial target size before jitter information is gathered, such as a initial jitter buffer size or two or three media frames.

The messaging client 310 may comprise a media playback component 360, the media playback component 360 generally arranged to playback a media stream. The media playback component 360 may be generally arranged to decode the media frames 380 and play the media content comprised within the media frames 380 for the user of the first client device 320. The media playback component 360 may iteratively request a next media frame of the media frames 380 from the media buffer component 350, receive a media frame, and play back the media frame. The media playback component 360 may play the media content through one or more speakers of the first client device 320, one or more audio output ports of the first client device 320, one or more display devices of the first client device 320, one or more display ports of the first client device 320, or using any other hardware devices of the first client devices 320. The media playback component 360 may decode the media content using one or more known codecs, standards, or formats. The media playback component 360 may generally decode and play media content using known techniques for media decoding and/or media playback.

Figure 4:
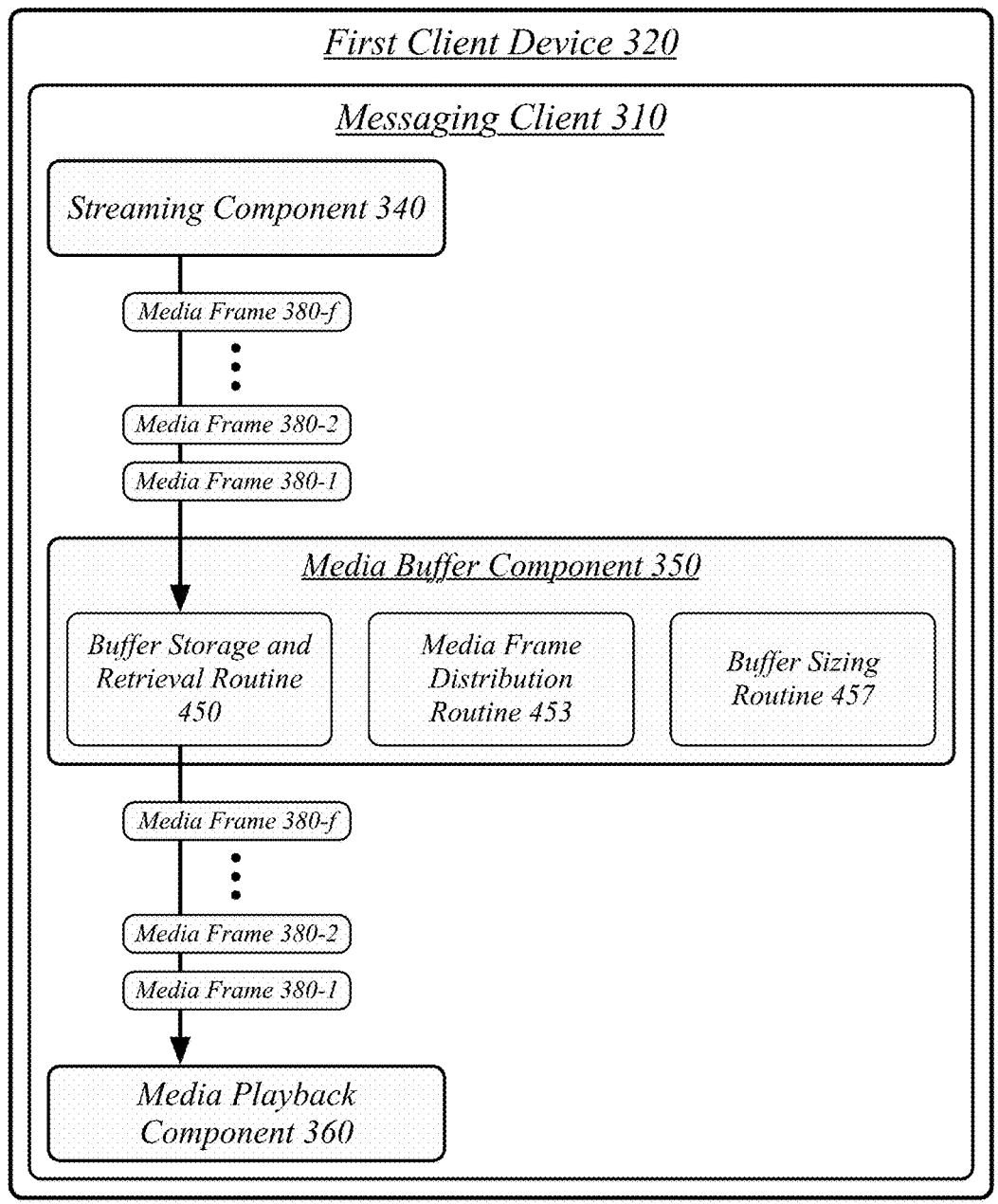
FIG. 4 illustrates an embodiment of the media buffer component.

FIG. 4 illustrates an embodiment of the media buffer component. The media buffer component 350 may comprise one or more routines, the one or more routines comprising a sequence of instructions operative on a processor circuit to perform one or more tasks in the performance of the operations of the media buffer component 350.

The media buffer component 350 may comprise a buffer storage and retrieval routine 450 operative to maintain a jitter buffer for a streaming network connection on a client device. The buffer storage and retrieval routine 450 may receive media frames 380 from the streaming component 340 and temporarily store the media frames 380 in the jitter buffer. The buffer storage and retrieval routine 450 may receive requests for media frames 380 from the media playback component 360 and provide media frames to the media playback component 360 on request. The buffer storage and retrieval routine 450 may receive a jitter buffer target size from the buffer sizing routine 457. The buffer storage and retrieval routine 450 may apply the jitter buffer target size to the maintaining of the jitter buffer for the streaming network connection. The buffer storage and retrieval routine 450 may provide media frame storage and retrieval information to a media frame distribution routine 453, such as by sending a signal, enacting a function call, or otherwise communicating to the media frame distribution routine 453 each time a media frame is added (e.g., put) to the jitter buffer and each time a media frame is removed (e.g., got) from the jitter buffer.

The buffer storage and retrieval routine 450 may be operative to reduce an actual occupancy of the jitter buffer down to the jitter buffer target size by selectively discarding one or more media frames from the jitter buffer. Selectively discarding one or more media frames may comprise selecting one or more media frames for discarding based on the selected one or more frames being identified as not containing the intend or primary content of the media stream. For instance, where the streaming network connection comprises a streaming voice network connection, the one or more media frames may be selected for discarding based on the one or more media frames being identified as not containing voice content. Identifying whether a media frame contains voice content may be performed using known techniques, such as voice-content-recognition techniques included as part of an audio codec or voice-specific audio codec.

The media buffer component 350 may comprise a media frame distribution routine 453 operative to generate a media frame distribution based on at least one of media frame retrieval from the jitter buffer by the media playback component 360 and media frame addition to the jitter buffer by the streaming component 340. In some embodiments, the media frame distribution may comprise a media frame retrieval distribution and a media frame addition distribution. The media frame distribution routine 453 may generate the media frame retrieval distribution based on media frame retrieval from the jitter buffer by a media playback component. The media frame distribution routine 453 may generate the media frame addition distribution based on media frame addition to the jitter buffer by the streaming component.

Generating a media frame distribution may comprise instantiating a data structure comprising a plurality of distribution buckets, with each bucket assigned to a particular span of delay in media frame addition or media frame retrieval. Where a distinct media frame retrieval distribution and media frame addition distribution are used, a distinct set of buckets may be used for each. The span assigned to each bucket may be equal to the length of a media frame, with each bucket associated with a particular value corresponding to a particular multiple of the frame length. Upon each retrieval of a media frame, an addition may be made to the media frame retrieval distribution, the addition made to the bucket for the media frame retrieval distribution with an associated value equal to the length of time between that retrieval and the most recent addition to the jitter buffer divided by the frame length. Upon each addition of a media frame, an addition may be made to the media frame addition distribution, the addition made to the bucket for the media frame addition distribution with an associated value equal to the length of time between that addition and the most recent retrieval from the jitter buffer divided by the frame length.

In some embodiments, the media frame distribution routine 453 may normalize the media frame distribution. The media frame distribution routine 453 may normalize the media frame distribution with each additional data point added, such that the total area of the media frame distribution sums to one (1). The normalization of the media frame distribution may serve to reduce the effects of outlying results, such as unusually large latencies that are not typical of the media frame distribution. As such, in some embodiments, particularly where normalization is used, the predefined percentage used by the buffer size routine 457 may be one-hundred percent as the normalization process may be sufficient to prevent an unnecessarily-large jitter buffer target size from being assigned.

The media buffer component 350 may comprise a buffer sizing routine 457 operative to determine a jitter buffer target size based on the media frame distribution. The buffer sizing routine 457 may determine the jitter buffer target size and assign the jitter buffer target size to the buffer storage and retrieval routine 450. The buffer sizing routine 457 may determine a jitter buffer size covering at least a predefined percentage of the media frame distribution and assign the jitter buffer target size to be equal to the jitter buffer size covering at least the predefined percentage of the media frame distribution. A jitter buffer size covering the predefined percentage of the media frame distribution may be the jitter buffer size which would prevent media frame requests from the media playback component 360 from hitting an empty jitter buffer at least the predefined percentage of the time retrospectively based on the media frame distribution. The jitter buffer size may be assigned as the minimum size to cover the predefined percentage of the media frame distribution.

In some embodiments, the media frame distribution may comprise a media frame retrieval distribution and a media frame addition distribution. The media frame distribution routine 453 may update the media frame retrieval distribution upon each retrieval of one or more frames from the jitter buffer. The media frame distribution routine 453 may update the media frame addition distribution upon each addition of one or more frames from the jitter buffer. Determining the jitter buffer target size may comprise determining a retrieval jitter buffer size covering at least a predefined percentage of the media frame retrieval distribution, determining an addition jitter buffer size covering at least the predefined percentage of the media frame addition distribution, and assigning the jitter buffer target size to be equal to the maximum of the retrieval jitter buffer size and the addition jitter buffer size.

Figure 5:
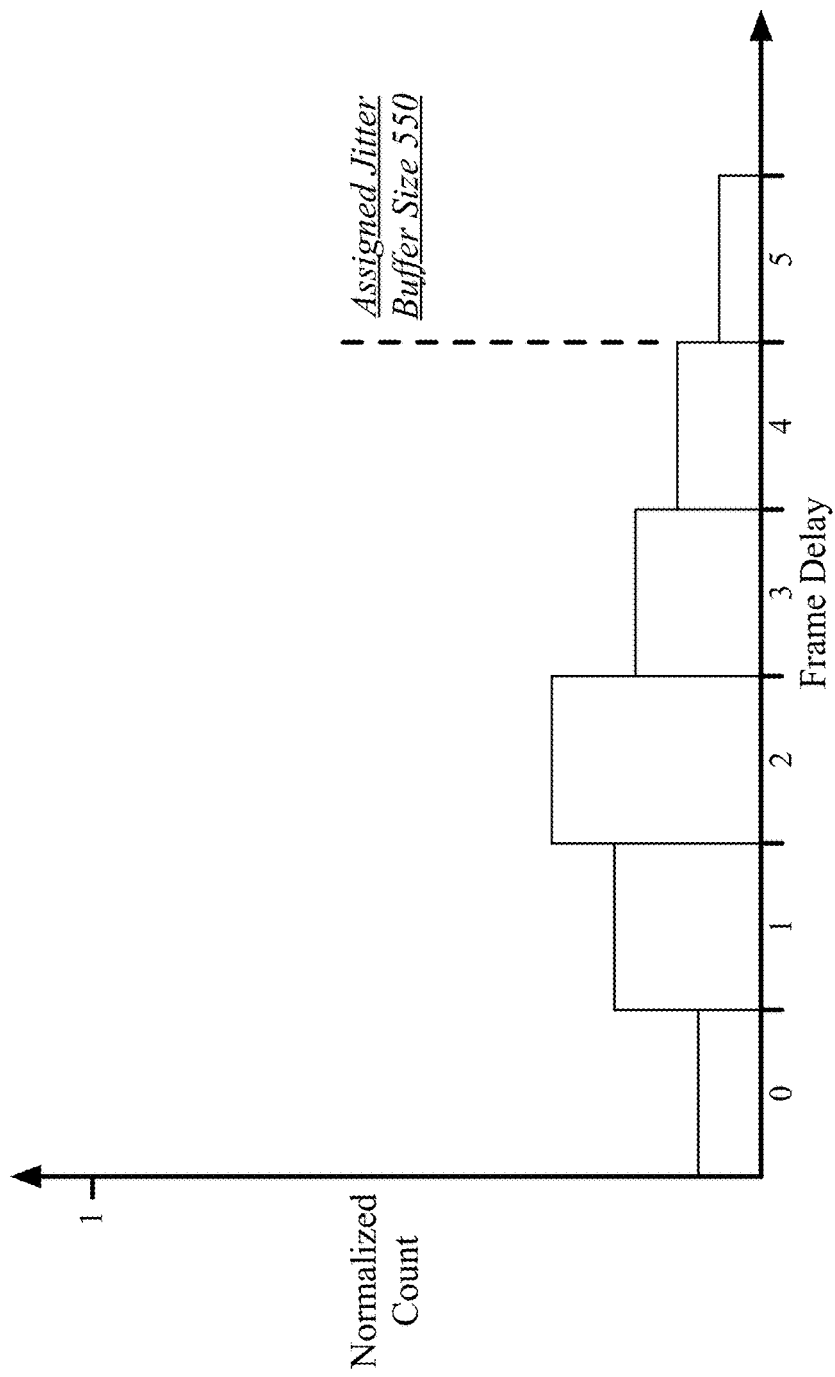
FIG. 5 illustrates an embodiment of a jitter buffer usage distribution.

FIG. 5 illustrates an embodiment of a jitter buffer usage distribution. The jitter buffer usage distribution is represented as a graph 500. The graph 500 may comprise a comparison between buckets for spans of frame delay as compared to a normalized count, or derived probability, for each bucket.

The jitter buffer usage distribution may comprise a normalized distribution in which the discrete values of the distribution are normalized to sum to one (1) to form a discrete probability distribution based on the history of the streaming network connection. The normalization may occur continuously as additional measurements are made, with each measurement of a frame delay resulting in a renormalization of the jitter buffer usage distribution. Alternatively, the normalization may be performed periodically, such as in preparation for a periodic reevaluation of the jitter buffer size.

The jitter buffer usage distribution may be split into discrete buckets of measurement, wherein each bucket corresponds to a portion of the possible space of frame delay equal to the length of a frame, such that each bucket corresponds to a particular number of frame lengths that have passed between an addition of a media frame and a retrieval of a media frame, or vice-versa. Where both a media frame retrieval distribution and a media frame addition distribution are used, an entry in the media frame retrieval distribution may correspond to the number of whole multiples of the frame length that passed between the most-recent frame addition and a media frame retrieval being measured, such that the value of the bucket to which the measurement is assigned equals the delay between the most-recent frame addition and the media frame retrieval being measured divided by the frame length then rounded down. For example, if the graph 500 corresponds to a media frame retrieval distribution, and the frame length is twenty milliseconds, then a measured frame delay of thirty milliseconds would result in an addition to the bucket labeled "1" as only one whole frame length would have passed between the most-recent addition and the measured retrieval, with the partial frame length discarded.

Where both a media frame retrieval distribution and a media frame addition distribution are used, an entry in the media frame addition distribution may correspond to the number of whole multiples of the frame length that passed between the most-recent frame retrieval and a media frame addition being measured, such that the value of the bucket to which the measurement is assigned equals the delay between the most-recent frame retrieval and the media frame addition being measured divided by the frame length then rounded down. For example, if the graph 500 corresponds to a media frame addition distribution, and the frame length is twenty milliseconds, then a measured frame delay of fifty-five milliseconds would result in an addition to the bucket labeled "2" as two whole frame lengths would have passed between the most-recent retrieval and the measured addition, with the partial frame length discarded.

The jitter buffer usage distribution, which may comprise both a media frame retrieval distribution and a media frame addition distribution, may be used to determine the assigned jitter buffer size 550 assigned to the buffer storage and retrieval routine 450. The assigned jitter buffer size 550 may be assigned to be the minimum size that covers a predefined percentage of the jitter buffer usage distribution. In the illustrated embodiment of FIG. 5, the cumulative probabilities of the frame delays zero through four may be the minimum cumulative span (starting at the zero bucket) greater than or equal to the predefined percentage. The assigned jitter buffer size 550 may then be assigned as equal to one greater than the highest-value bucket in the minimum cumulative span, which is also equal to the number of buckets spanned by the minimum cumulative span. In some embodiments, the predefined percentage may be one-hundred percent.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may maintain a jitter buffer for a streaming network connection on a client device at block 602.

The logic flow 600 may generate a media frame distribution based on at least one of media frame retrieval from the jitter buffer by a media playback component and media frame addition to the jitter buffer by a streaming component at block 604.

The logic flow 600 may determine a jitter buffer target size based on the media frame distribution at block 606.

The logic flow 600 may apply the jitter buffer target size to the maintaining of the jitter buffer for the streaming network connection at block 608.

The embodiments are not limited to this example.

Figure 7:
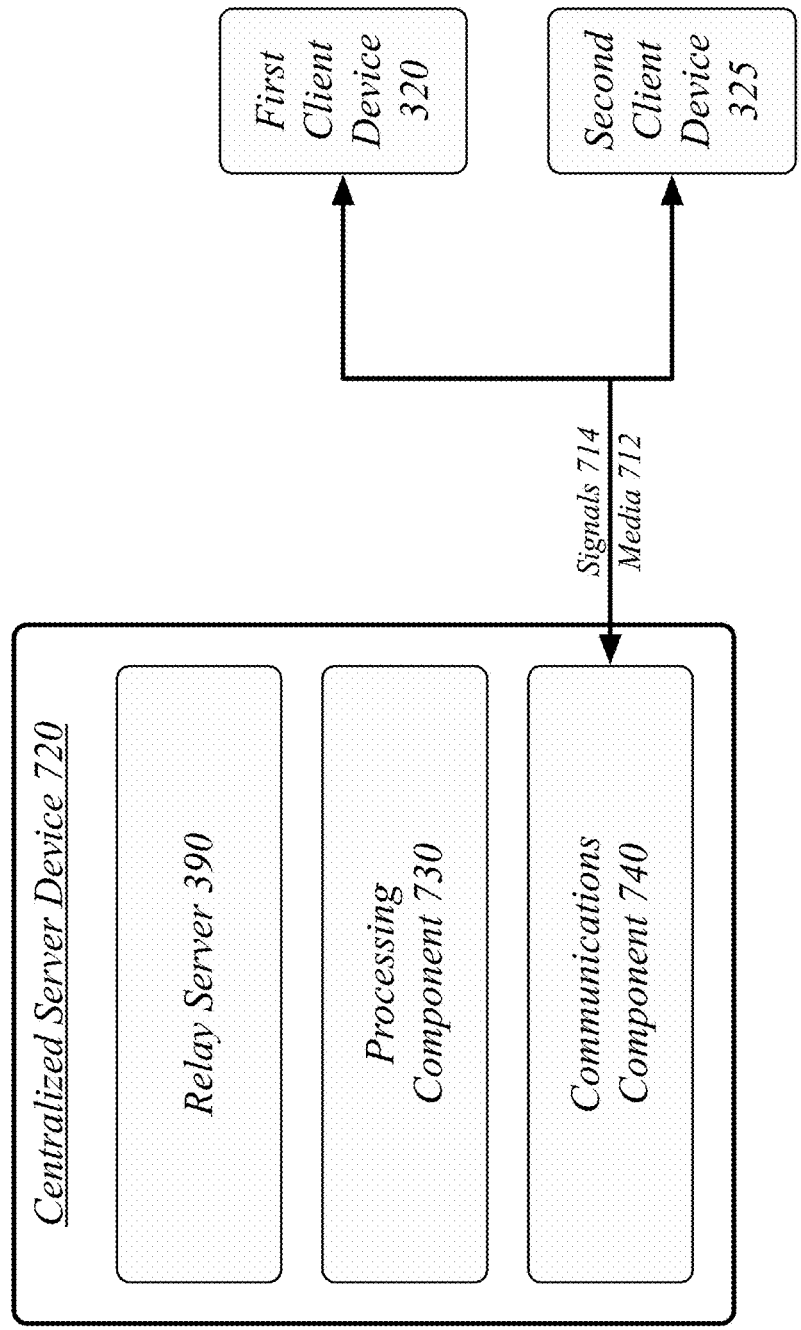
FIG. 7 illustrates an embodiment of a centralized system for the system of FIG. 1.

FIG. 7 illustrates a block diagram of a centralized system 700. The centralized system 700 may implement some or all of the structure and/or operations for the jitter buffer configuration system 100 in a single computing entity, such as entirely within a single centralized server device 720.

The centralized server device 720 may comprise any electronic device capable of receiving, processing, and sending information for the jitter buffer configuration system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the jitter buffer configuration system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the jitter buffer configuration system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The centralized server device 720 may execute a relay server 390, the relay server 390 operative to assist in the performance of streaming network connections. The relay server 390 may receive and forward network packets between the first client device 320 and second client device 325 as assistance to the performance of a streaming network connection, the receiving and forwarding of network packets comprising at least a portion of the signals 714 transmitted via media 712.

Figure 8:
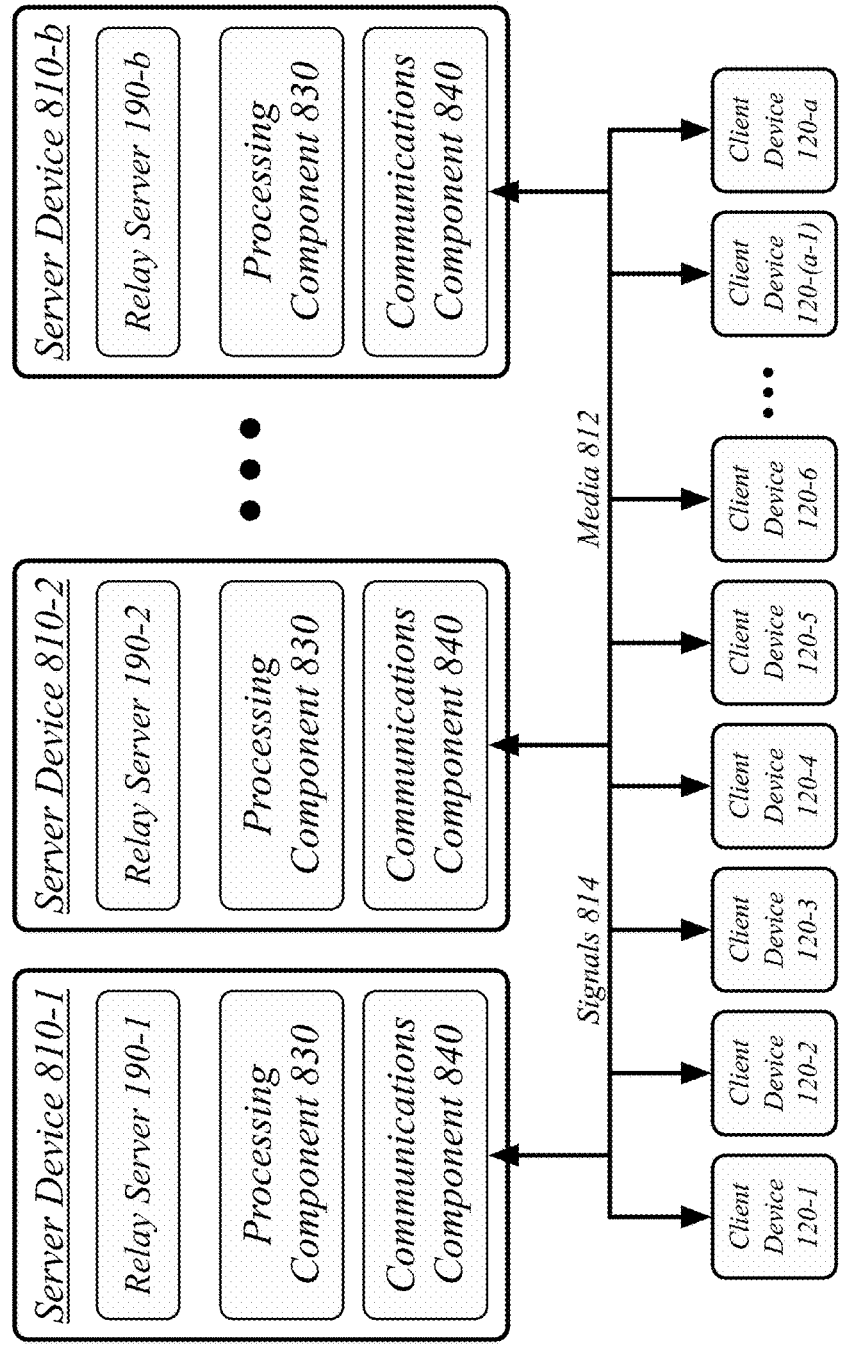
FIG. 8 illustrates an embodiment of a distributed system for the system of FIG. 1.

FIG. 8 illustrates a block diagram of a distributed system 800. The distributed system 800 may distribute portions of the structure and/or operations for the jitter buffer configuration system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 810. In general, the server devices 810 may be the same or similar to the centralized server device 720 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The server devices 810 may comprise or employ one or more programs that operate to perform various methodologies in accordance with the described embodiments. In one embodiment, for example, the server devices 810 may each implement a relay server of a plurality of relay servers 190, as described with reference to FIG. 1.

Figure 9:
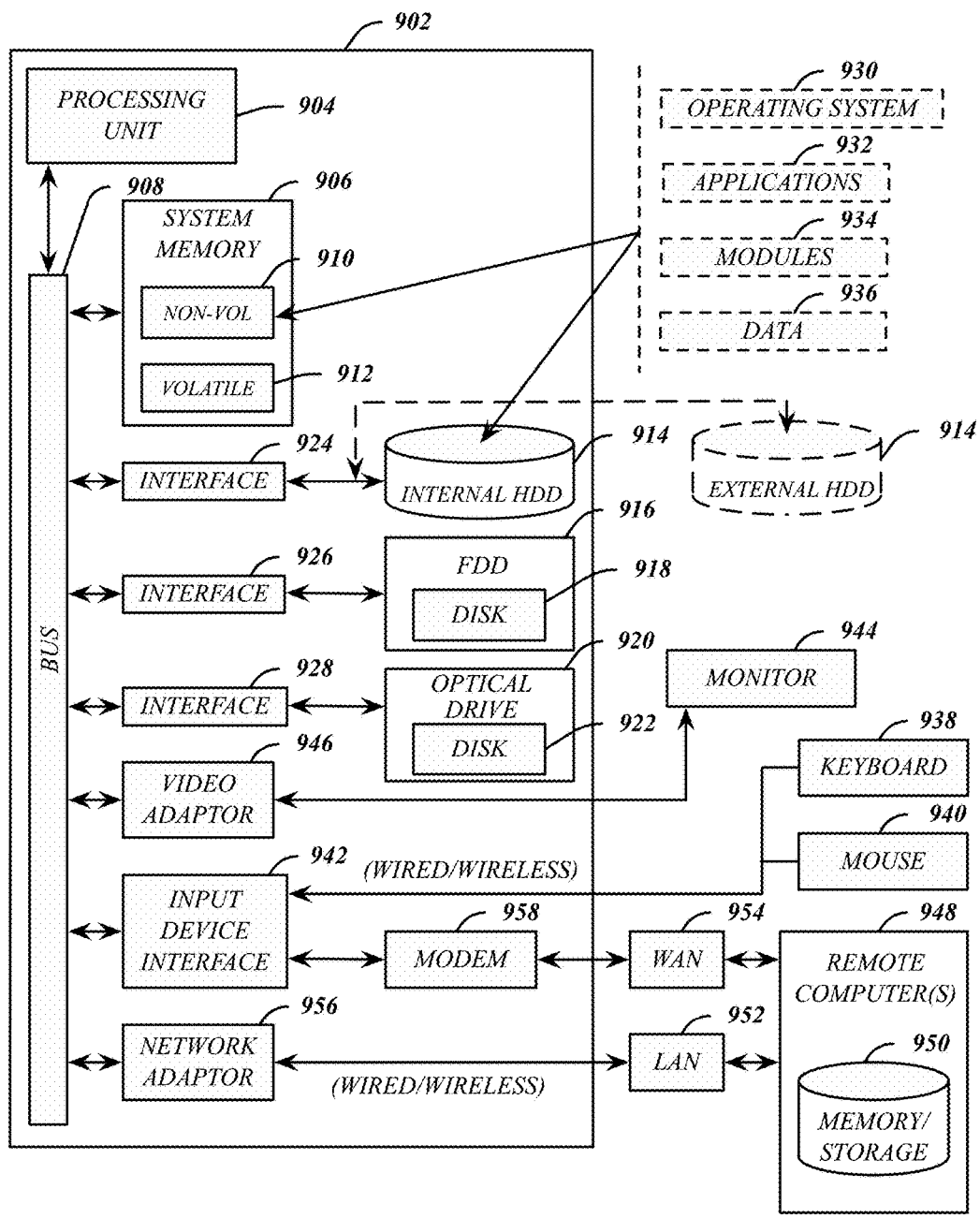
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIGS. 1, 3, 7, and 8, among others, such as the client devices 120, the first client device 320, the second client device 325, the centralized server device 720, and the server devices 810. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the jitter buffer configuration system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
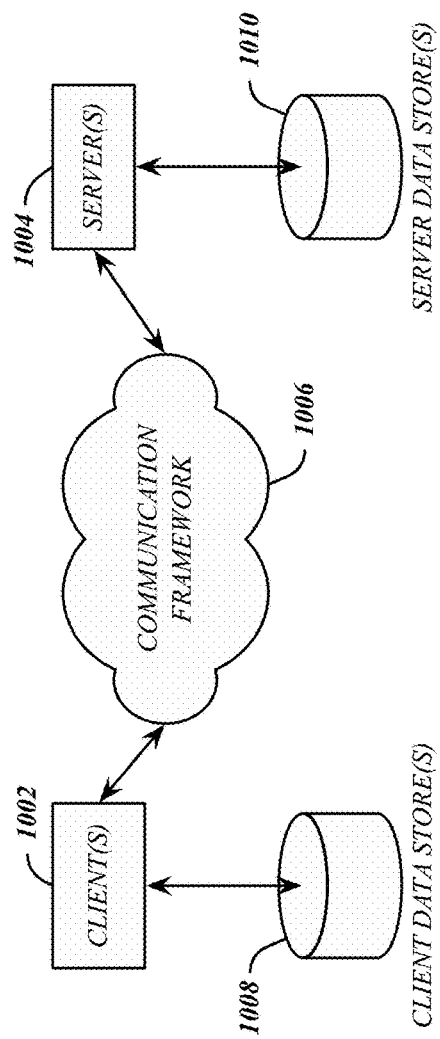
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the first server device 910. The servers 1004 may implement the second server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
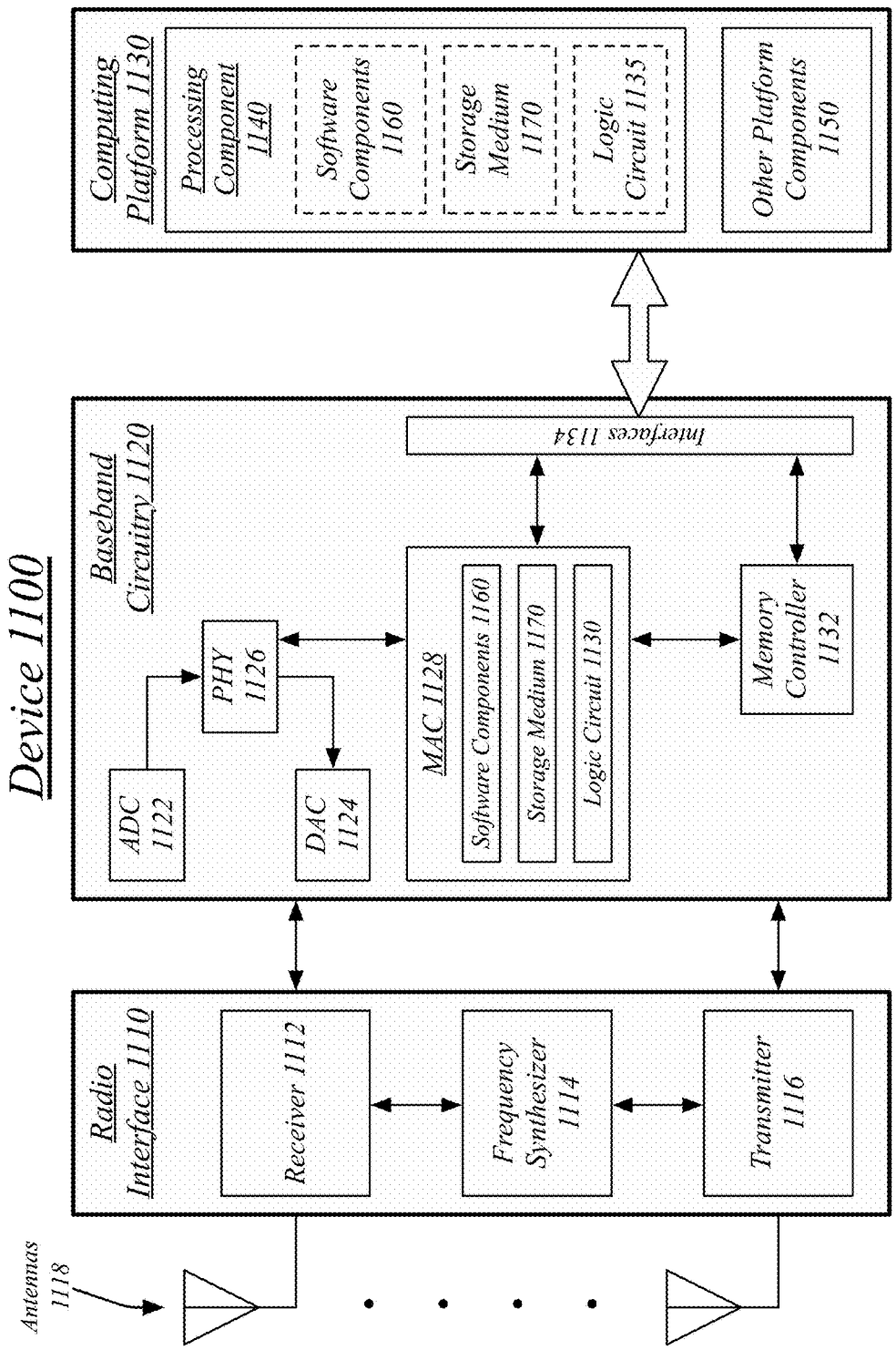
FIG. 11 illustrates an embodiment of a radio device architecture.

FIG. 11 illustrates an embodiment of a device 1100 for use in a multicarrier OFDM system, such as the jitter buffer configuration system 100. Device 1100 may implement, for example, software components 1160 as described with reference to jitter buffer configuration system 100 and/or a logic circuit 1135. The logic circuit 1135 may include physical circuits to perform operations described for the jitter buffer configuration system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the jitter buffer configuration system 100 and/or logic circuit 1135 in a single computing entity, such as entirely within a single device. Alternatively, the device 1100 may distribute portions of the structure and/or operations for the jitter buffer configuration system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the jitter buffer configuration system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise maintaining a jitter buffer for a streaming network connection on a client device; generating a media frame distribution based on at least one of media frame retrieval from the jitter buffer by a media playback component and media frame addition to the jitter buffer by a streaming component; determining a jitter buffer target size based on the media frame distribution; and applying the jitter buffer target size to the maintaining of the jitter buffer for the streaming network connection.

A computer-implemented method may further comprise wherein determining the jitter buffer target size comprises determining a jitter buffer size covering at least a predefined percentage of the media frame distribution and assigning the jitter buffer target size to be equal to the jitter buffer size covering at least the predefined percentage of the media frame distribution.

A computer-implemented method may further comprise normalizing the media frame distribution.

A computer-implemented method may further comprise reducing an actual occupancy of the jitter buffer down to the jitter buffer target size by selectively discarding one or more media frames from the jitter buffer.

A computer-implemented method may further comprise the streaming network connection comprising a streaming voice network connection, wherein the one or more media frames are selected for discarding based on the one or more media frames being identified as not containing voice content.

A computer-implemented method may further comprise the media frame distribution comprising a media frame retrieval distribution and a media frame addition distribution, further comprising: generating the media frame retrieval distribution based on media frame retrieval from the jitter buffer by a media playback component; and generating the media frame addition distribution based on media frame addition to the jitter buffer by the streaming component.

A computer-implemented method may further comprise wherein determining the jitter buffer target size comprises determining a retrieval jitter buffer size covering at least a predefined percentage of the media frame retrieval distribution, determining an addition jitter buffer size covering at least the predefined percentage of the media frame addition distribution, and assigning the jitter buffer target size to be equal to the maximum of the retrieval jitter buffer size and the addition jitter buffer size.

A computer-implemented method may further comprise updating the media frame retrieval distribution upon each retrieval of one or more frames from the jitter buffer; and updating the media frame addition distribution upon each addition of one or more frames from the jitter buffer.

An apparatus may comprise a processor circuit on a client device; a network interface controller on a client device; a streaming component operative on the processor circuit to perform a streaming network connection for a media stream via the network interface controller; a media playback component operative on the processor circuit to playback the media stream; a media buffer component operative to maintain a jitter buffer for a streaming network connection on a client device; generate a media frame distribution based on at least one of media frame retrieval from the jitter buffer by the media playback component and media frame addition to the jitter buffer by the streaming component; determine a jitter buffer target size based on the media frame distribution; and apply the jitter buffer target size to the maintaining of the jitter buffer for the streaming network connection. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   maintaining a jitter buffer for a streaming network connection on a client device;
   generating a data structure containing a media frame delay distribution based on at least one of media frame retrieval from the jitter buffer by a media playback component and media frame addition to the jitter buffer by a streaming component, the media frame distribution split into discrete buckets of measurement, each bucket corresponding to a span of delay, each bucket containing a count of the number of times a delay between the most recent retrieval of a frame from the jitter buffer and the most recent addition to the jitter buffer fell within the span of delay represented by that bucket;
   upon each addition to or retrieval of a frame form the jitter buffer, incrementing the count associated with the bucket representing the delay between the most recent addition of a frame to the jitter buffer and the most recent retrieval of a frame from the jitter buffer;
   determining a jitter buffer target size by determining a jitter buffer size which would prevent at least one of media frame retrievals from the jitter buffer by the media playback component or media frame additions to the jitter buffer by the streaming component from hitting an empty jitter buffer at least a predefined percentage of the time, based on a retrospective analysis the media frame delay distribution; and
   adjusting the size of the jitter buffer to the jitter buffer target size.

2. The method of claim 1, further comprising:
   normalizing the media frame distribution.

3. The method of claim 1, further comprising:
   reducing an actual occupancy of the jitter buffer down to the jitter buffer target size by selectively discarding one or more media frames from the jitter buffer.

4. The method of claim 3, the streaming network connection comprising a streaming voice network connection, wherein the one or more media frames are selected for discarding based on the one or more media frames being identified as not containing voice content.

5. The method of claim 1, the media frame distribution comprising a media frame retrieval distribution and a media frame addition distribution, further comprising:
   generating the media frame retrieval distribution based on media frame retrieval from the jitter buffer by a media playback component; and
   generating the media frame addition distribution based on media frame addition to the jitter buffer by the streaming component.

6. The method of claim 5, wherein determining the jitter buffer target size comprises determining a retrieval jitter buffer size, determining an addition jitter buffer size and assigning the jitter buffer target size to be equal to the maximum of the retrieval jitter buffer size and the addition jitter buffer size.

7. An apparatus, comprising:
   a processor circuit on a client device;
   a network interface controller on a client device;
   a streaming component operative on the processor circuit to perform a streaming network connection for a media stream via the network interface controller;
   a media playback component operative on the processor circuit to playback the media stream; and a media buffer component operative to:
  maintain a jitter buffer for a streaming network connection on a client device;
  generate a data structure containing a media frame delay distribution based on at least one of media frame retrieval from the jitter buffer by the media playback component and media frame addition to the jitter buffer by the streaming component;
  wherein the media frame distribution is split into discrete buckets of measurement, each bucket corresponding to a span of delay, each bucket containing a count of the number of times a delay between the most recent retrieval of a frame from the jitter buffer and the most recent addition to the jitter buffer fell within the span of delay represented by that bucket;
  upon each addition to or retrieval of a frame form the jitter buffer, incrementing the count associated with the bucket representing the delay between the most recent addition of a frame to the jitter buffer and the most recent retrieval of a frame from the jitter buffer;
  determine a jitter buffer target size by determining a jitter buffer size which would prevent at least one of media frame retrievals from the jitter buffer by the media playback component or media frame additions to the jitter buffer by the streaming component from hitting an empty jitter buffer at least a predefined percentage of the time, based on a retrospective analysis the media frame delay distribution; and
  adjusting the size of the jitter buffer to the jitter buffer target size.

8. The apparatus of claim 7, further comprising:
the media buffer component operative to reduce an actual occupancy of the jitter buffer down to the jitter buffer target size by selectively discarding one or more media frames from the jitter buffer.

9. The apparatus of claim 7, the media frame distribution comprising a media frame retrieval distribution and a media frame addition distribution, further comprising:
  the media buffer component operative to generate the media frame retrieval distribution based on media frame retrieval from the jitter buffer by a media playback component; and generate the media frame addition distribution based on media frame addition to the jitter buffer by the streaming component.

10. The apparatus of claim 9, wherein determining the jitter buffer target size comprises determining a retrieval jitter buffer size, determining an addition jitter buffer size and assigning the jitter buffer target size to be equal to the maximum of the retrieval jitter buffer size and the addition jitter buffer size.

11. At least one computer-readable storage medium comprising instructions that, when executed, cause a system to:
  maintain a jitter buffer for a streaming network connection on a client device;
  generate a data structure containing a media frame delay distribution based on at least one of media frame retrieval from the jitter buffer by a media playback component and media frame addition to the jitter buffer by a streaming component, the media frame distribution split into discrete buckets of measurement, each bucket corresponding to a span of delay, each bucket containing a count of the number of times a delay between the most recent retrieval of a frame from the jitter buffer and the most recent addition to the jitter buffer fell within the span of delay represented by that bucket;
  upon each addition to or retrieval of a frame form the jitter buffer, incrementing the count associated with the bucket representing the delay between the most recent addition of a frame to the jitter buffer and the most recent retrieval of a frame from the jitter buffer;
  determine a jitter buffer target size by determining a jitter buffer size which would prevent at least one of media frame retrieval from the jitter buffer by the media playback component or media frame additions to the jitter buffer by the streaming component from hitting an empty jitter buffer at least a predefined percentage of the time, based on a retrospective analysis the media frame delay distribution; and
  adjust the size of the jitter buffer to the jitter buffer target size.

12. The computer-readable storage medium of claim 11, comprising further instructions that, when executed, cause a system to:
  reduce an actual occupancy of the jitter buffer down to the jitter buffer target size by selectively discarding one or more media frames from the jitter buffer.

13. The computer-readable storage medium of claim 11, the media frame distribution comprising a media frame retrieval distribution and a media frame addition distribution, comprising further instructions that, when executed, cause a system to:
  generate the media frame retrieval distribution based on media frame retrieval from the jitter buffer by a media playback component; and
  generate the media frame addition distribution based on media frame addition to the jitter buffer by the streaming component.

14. The computer-readable storage medium of claim 13, wherein determining the jitter buffer target size comprises determining a retrieval jitter buffer size, determining an addition jitter buffer size and assigning the jitter buffer target size to be equal to the maximum of the retrieval jitter buffer size and the addition jitter buffer size.

* * * * *